(12) United States Patent
Fleischer

(10) Patent No.: US 7,555,746 B2
(45) Date of Patent: Jun. 30, 2009

(54) SYSTEM AND METHOD FOR REGISTERING NATIVE LIBRARIES WITH NON-NATIVE ENTERPRISE PROGRAM CODE

(75) Inventor: Christian Fleischer, Mannheim (DE)

(73) Assignee: SAP AG, Walldorf (DE)

( * ) Notice: Subject to any disclaimer, the term of this patent is extended or adjusted under 35 U.S.C. 154(b) by 747 days.

(21) Appl. No.: 11/009,330

(22) Filed: Dec. 9, 2004

(65) Prior Publication Data

US 2006/0129989 A1  Jun. 15, 2006

(51) Int. Cl.
*G06F 9/44* (2006.01)
(52) U.S. Cl. .................................... 717/148
(58) Field of Classification Search ............... None
See application file for complete search history.

(56) References Cited

U.S. PATENT DOCUMENTS 6,330,709 B1 * 12/2001 Johnson et al. ............. 717/100
6,349,344 B1 * 2/2002 Sauntry et al. ............. 719/332
7,003,770 B1 * 2/2006 Pang et al. .................. 718/100
2005/0278274 A1 * 12/2005 Kovachka-Dimitrova et al. 707/1

OTHER PUBLICATIONS

"Design Overview", 2003 Sun Microsystems, http://java.sun.com.j2se/1.5.0/docs/guide/jni/spec/design.html, retrieved on Jan. 18, 2008.*

* cited by examiner

*Primary Examiner*—Wei Y. Zhen
*Assistant Examiner*—Philip R. Wang
(74) *Attorney, Agent, or Firm*—Blakely, Sokoloff, Taylor & Zafman LLP

(57) ABSTRACT

A system and method are described for implementing native methods within a Java environment. The native methods may be used, for example, as part of a startup framework for a cluster of Java application servers. In one embodiment, a class object for a the class containing the native methods is instantiated in a memory. After the class object is loaded, one or more function pointers are inserted within the class object. The function pointers include identification information identifying an implementation of the native methods.

18 Claims, 4 Drawing Sheets

SYSTEM AND METHOD FOR REGISTERING NATIVE LIBRARIES WITH NON-NATIVE ENTERPRISE PROGRAM CODE

BACKGROUND

1. Field of the Invention

This invention relates generally to the field of data processing systems which employ both native and non-native libraries. More particularly, the invention relates to improved techniques for registering native libraries within a non-native program code.

2. Description of the Related Art

The Java Programming Environment

The Java™ programming language has attracted a considerable amount of attention over the past decade. The popularity of Java™ is due, at least in part, to the fact that it is platform independent, object-oriented and dynamic in nature. In addition, the Java™ environment removes many of the tedious and error-prone tasks which must be performed by an application programmer, including memory management and cross-platform porting. As a result, Java™ programmers can focus on issues related to design and functionality.

Platform independence in Java™ is achieved through the use of a special interpreter, referred as a "virtual machine," which allows generic instructions to be executed on multiple computing platforms (i.e., multiple processors and operating systems). The generic instructions, or "bytecode," are converted at runtime by the virtual machine into native instructions that each individual computing platform can process. Platform independence is one of the primary benefits of the Java™ language. By contrast, program code written in languages such as C and C++ is compiled directly into native instructions which may only be executed on one specific type of computing platform.

Java™ is also an object oriented language in which the bytecode processed by the virtual machine is organized into "classes" of likeness. For example, the software used to sell items to customer X might belong to the same class of software (e.g., a class named "sales") that is used to sell items to customer Y. Here, given that a significant degree of overlap is expected to exist regarding the methods and data types used to process sales for both customers X and Y (e.g., an "update billing about sale" method, an "update accounting about sale" method, a "part number" data type, a "quantity" data type . . . etc.) it is deemed more efficient to organize such methods and data types into a generic "sales" class from which specific instances of the class (e.g., an instance for selling to customer X and an instance for selling to customer Y) can be defined and created.

Each specific instance of a class is referred to as an object; and, each object assumes the characteristics of the class from which it is defined. Thus, a first object could be created from the generic sales class to create a "sell to customer X" object; and, a second object could be created from the generic sales class to create a "sell to customer Y" object. Both objects would be able to execute the methods defined by the class. For example, the "sell to customer X" object could execute the "update accounting about sale" method to update an accounting department about a sale to customer X; and, the "sell to customer Y" object could also execute the "update accounting about sale" method to update an accounting department about a sale to customer Y.

In general, the runtime execution of any computer program can be viewed as the execution of a sequence of methods. With respect to an object-oriented approach, such a sequence of methods can be implemented by calling upon a sequence of objects and invoking one or more methods of each object. In order to invoke the method of an object, a representation of the object is typically created beforehand. In virtual machine-based object-oriented software environments, classfiles are bytecode-level data structures from which such representations are created. A classfile can be viewed as a bytecode level description of a class; and, therefore, a classfile can be used as a template for the formation of an object, at the bytecode level, that is a member of the class. As specific methods can be attributed to specific classes, each classfile is made to contain the sequence of bytecode instructions that correspond to each of the class's specific methods.

The Java Native Interface ("JNI")

Although Java™ includes many desirable features such as platform independence and scalability, there are a number of reasons why a programmer may choose to employ platform-dependent native code. For example, it may be necessary to implement time-critical or computationally-intensive processing tasks in a native programming language, such as C, C++, or FORTRAN. In addition, the institutional investment of many companies in existing native software programs may make it too burdensome and expensive to re-implement the native routines in Java™.

To address the foregoing issues, Java™ code may be integrated with native applications and libraries using the Java™ Native interface ("JNI"). JNI allows functions coded in languages other than Java™ to be called from within Java bytecode and vice versa. This enables methods to be included within Java™ objects and classes that call native code functions. When called, the native code bypasses the virtual machine, directly invoking resources of the native operating system and processor.

Java™ application ("Hello World") which invokes a native library. At step 100, the Java™ program is written. By way of example, the following Java™ program defines a class HelloWorld which has a single native method, displayHelloWorld( ), declared in the second line of the program:

```
class HelloWorld {
    public native void displayHelloWorld( );
    static {
        System.loadLibrary ("hello");
    }
    public static void main(String[] args) {
        new HelloWorld( ).displayHelloWorld( );
    }
}
```

The native method corresponds to a well known C program that generates the message "Hello World!" on a display device. The native method declaration provides the method signature for displayHelloWorld but does not provide an implementation for the method. The implementation for the method must be provided in a separate native language source file.

The HelloWorld class uses the static initializer System.loadLibrary which locates the shared library that will be created when the implementation code is compiled, and loads the native library into the application. The argument to System.loadLibrary is the shared library name. The system uses a standard, but platform-specific, approach to convert the library name to a native library name. For example, the Solaris system converts the library name "hello" to hello.so, while a Microsoft Windows system converts the same name to hello.dll.

Returning to FIG. 1, at 101, the a Java™ compiler (javac) is used to compile the Java™ source code, thereby generating the HelloWorld.class file. At 102, the javah tool is used to generate a JNI style header file used when implementing the native method in C or C++. The name of the header file is the class name with a '.h' extension (HelloWorld.h).

At 103, the implementation of the native method is generated. The implementation uses #include statements to include the HelloWorld.h header file generated by javah, the jni.h file, which provides information the native code needs to call JNI functions, and the stdio.h file for the printf function. At 104 the source code HelloWorldImp.c generated from the previous step is compiled as a shared library (e.g., using the -G option for the Solaris compiler or the -LD compiler option for the Microsoft Visual C++ compiler). Finally, at 105 the Java application HelloWorld.Class is executed within the Java virtual machine, resulting in the execution of the native code (and "Hello World!" as an output).

One problem which exists with the foregoing process for integrating native code and Java is that, under certain conditions, the static initializer System.loadLibrary may not be used. For example, certain native methods which are not implemented as dynamic libraries cannot be loaded via the System.loadLibrary class. As such, more advanced techniques are needed to implement certain types of native code within a Java environment.

SUMMARY

A system and method are described for implementing native methods within a Java environment. The native methods may be used, for example, as part of a startup framework for a cluster of Java application servers. In one embodiment, a class object for a the class containing the native methods is instantiated in a memory. After the class object is loaded, one or more function pointers are inserted within the class object. The function pointers include identification information identifying an implementation of the native methods.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Described below is a system and method for managing session data within a multi-tiered enterprise network. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

As mentioned above in the background section of this application, the standard techniques provided by the Java Native Interface ("JNI") for integrating native code with Java are ineffective under certain conditions. As such, one embodiment of the invention introduces new techniques for registering native libraries with loaded Java classes. Because these techniques are commonly implemented during the startup of an application server cluster, the introduction below describes an exemplary cluster architecture followed by a process for starting up the cluster. The embodiments of the invention related to registering native libraries are described following the introduction.

Introduction

A. An Exemplary Cluster Architecture

Figure 1:
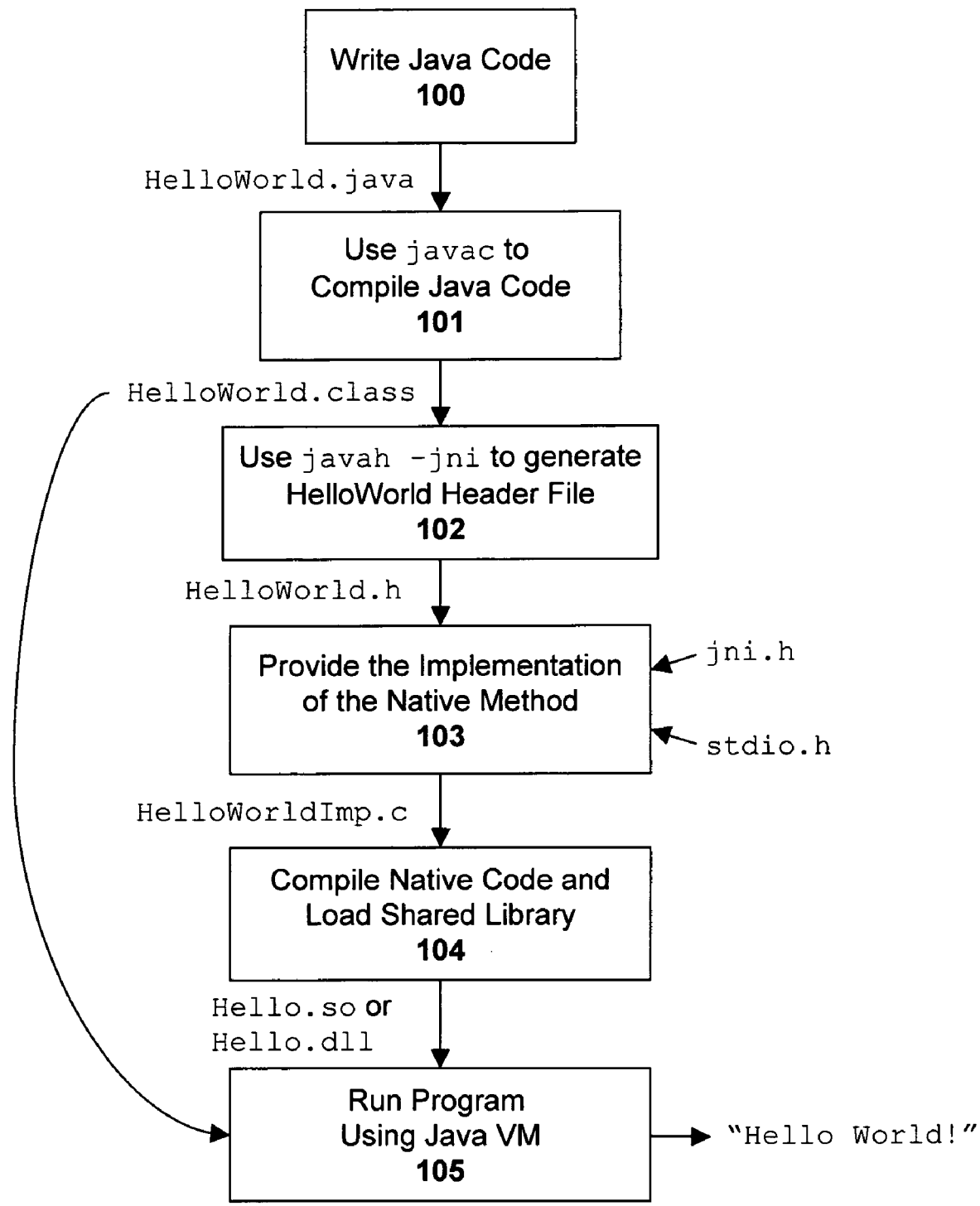
FIG. 1 illustrates a flowchart for implementing a simple Java application ("Hello World") which invokes a native library.
Figure 2:
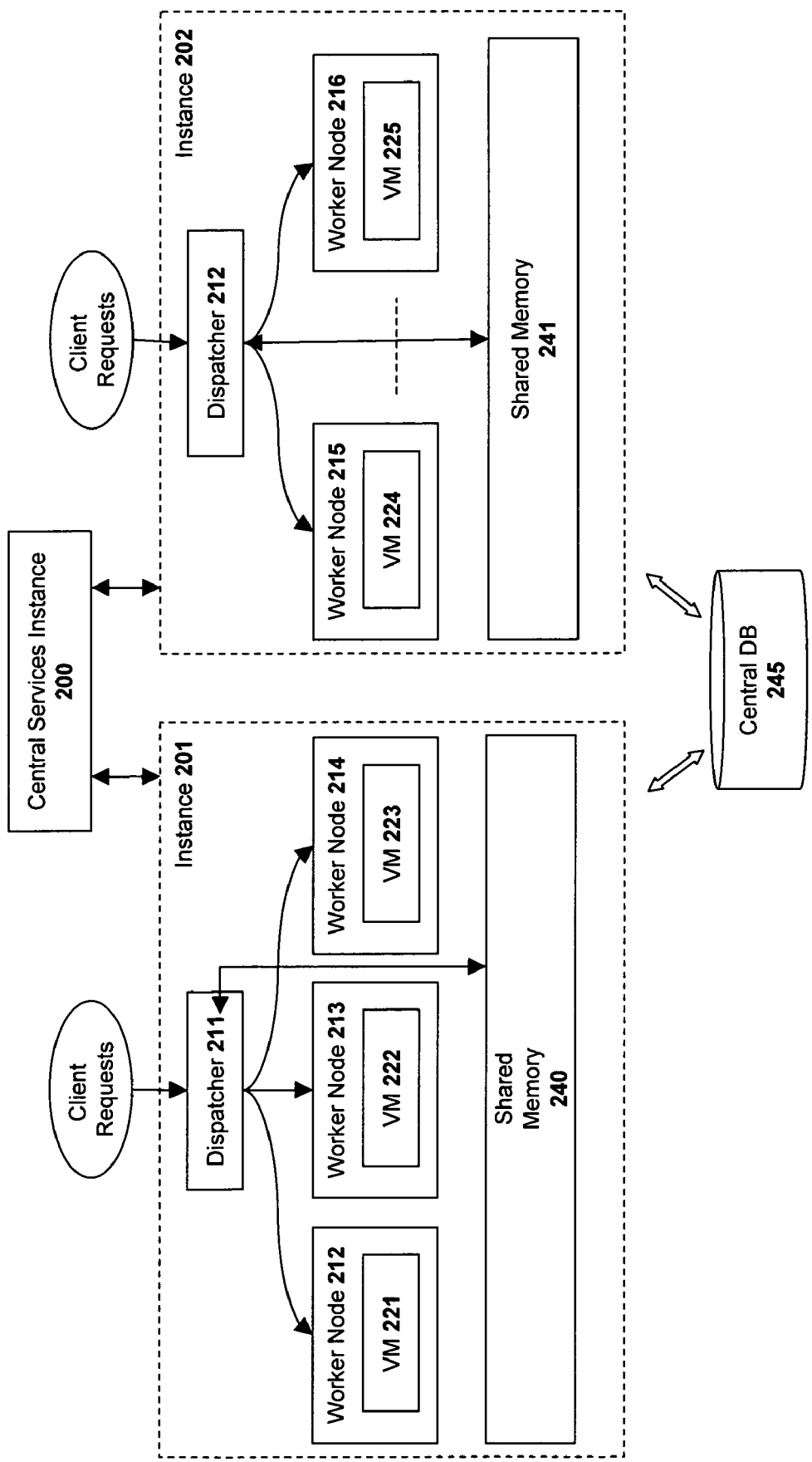
FIG. 2 illustrates an exemplary cluster architecture on which embodiments of the invention are implemented.

A system architecture according to one embodiment of the invention is illustrated in FIG. 2. The architecture includes a plurality of application server "instances" 201 and 202. The application server instances 201 and 202 each include a group of worker nodes 212-214 and 215-216 (also sometimes referred to herein as "server nodes"), respectively, and a dispatcher 211 and 212, respectively. The application server instances 201, 202 communicate through a central services instance 200 using message passing techniques. In one embodiment, the central services instance 200 includes a locking service and a messaging service (described below). The combination of all of the application server instances 201 and 202 and the central services instance 200 is referred to herein as a "cluster." Although the following description will focus solely on instance 201 for the purpose of explanation, the same principles apply to other instances within the cluster.

The worker/server nodes 212-214 within instance 201 provide the business and/or presentation logic for the network applications supported by the system. Each of the worker nodes 212-214 within a particular instance may be configured with a redundant set of application logic and associated data, represented as virtual machines 221-223 in FIG. 2. In one embodiment, the dispatcher 211 distributes service requests from clients to one or more of the worker nodes 212-214 based on the load on each of the servers. For example, in one embodiment, the dispatcher maintains separate queues for each of the 212-214 in a shared memory 240. The dispatcher 211 fills the queues with client requests and the worker nodes 212-214 consume the requests from each of their respective queues.

In one embodiment, the worker nodes 212-214 may be Java 2 Enterprise Edition ("J2EE") worker nodes which support Enterprise Java Bean ("EJB") components and EJB containers (at the business layer) and Servlets and Java Server Pages ("JSP") (at the presentation layer). In this embodiment, the virtual machines 221-225 implement the J2EE standard (as well as the additional non-standard features described herein). It should be noted, however, that certain high-level features described herein may be implemented in the context of different software platforms including, by way of example, Microsoft.NET platforms and/or the Advanced Business Application Programming ("ABAP") platforms developed by SAP AG, the assignee of the present application.

In one embodiment, communication and synchronization between each of the instances 201, 202 is enabled via the central services instance 200. As mentioned above, the central services instance 200 includes a messaging service and a locking service. The message service allows each of the servers within each of the instances to communicate with one another via a message passing protocol. For example, messages from one server may be broadcast to all other servers within the cluster via the messaging service (e.g., such as the cache configuration messages described below). Alternatively, messages may be addressed directly to specific servers within the cluster (i.e., rather than being broadcast to all servers). In one embodiment, the locking service disables access to (i.e., locks) certain specified portions of configuration data and/or program code stored within a central database 245. The locking service locks data on behalf of various system components which need to synchronize access to specific types of data and program code. In one embodiment, the central services instance 200 is the same central services instance as implemented within the Web Application Server version 6.3 and/or 6.4 developed by SAP AG. However, the underlying principles of the invention are not limited to any particular type of central services instance.

In addition, unlike prior systems, one embodiment of the invention shares objects between virtual machines 221-225. Specifically, in one embodiment, objects which are identified as "shareable" are stored within a shared memory region 240, 241 and are made accessible to multiple virtual machines 221-225. Creating new object instances from scratch in response to client requests can be a costly process, consuming processing power and network bandwidth. As such, sharing objects between virtual machines as described herein improves the overall response time of the system and reduces server load.

In a shared memory implementation, a shared memory area 240, 241 or "heap" is used to store data objects that can be accessed by multiple virtual machines 221-225. The data objects in a shared memory heap should generally not have any pointers or references into any private heap (e.g., the private memory regions/heaps of the individual virtual machines). This is because if an object in the shared memory heap had a member variable with a reference to a private object in one particular virtual machine, that reference would be invalid for all the other virtual machines that use that shared object.

More formally, this restriction can be thought of as follows: For every shared object, the transitive closure of the objects referenced by the initial object should only contain shared objects at all times. Accordingly, in one implementation of the server 200, objects are not put into the shared memory heap by themselves—rather, objects (such as the session objects described herein) are put into the shared memory heap in groups known as "shared closures." A shared closure is an initial object plus the transitive closure of all the objects referenced by the initial object.

B. A Process for Starting Instances within the Cluster

Figure 3:
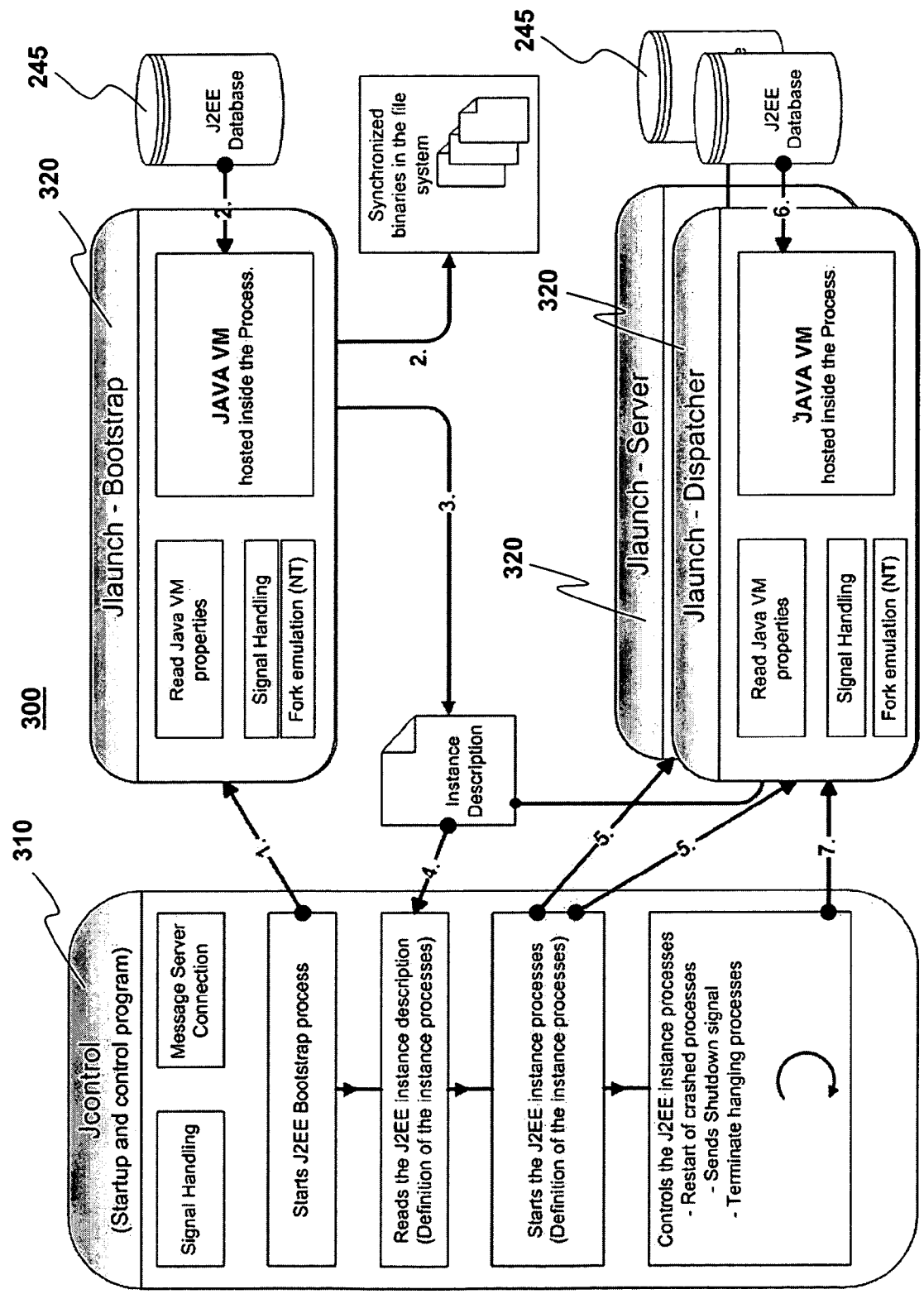
FIG. 3 illustrates an exemplary architecture and process for starting up the cluster architecture.

One embodiment of the invention employs a unique startup framework 300 for starting and stopping the various server instances within the cluster, as illustrated in FIGS. 3. The two primary components used in the startup framework 300 are referred to herein as the Java Control component ("JControl") 310 and the Java Launch component ("JLaunch") 320.

JControl, which in one embodiment is written in native code (e.g., C), is responsible for starting, stopping and controlling the processes of each instance. JControl is provided with a connection to the central services instance 200 to receive cluster-wide shutdown and startup notifications.

JLaunch, portions of which are also written in native code, is responsible for starting program code on each instance. In one embodiment, JLaunch loads the virtual machine into its own address space and instantiates each specified startup class. The JLaunch program reads a property file to retrieve information about each Java program and its arguments.

As indicated in FIG. 3, JLaunch may include bootstrap logic, which, in one embodiment is implemented in Java programming code. The bootstrap logic is responsible for synchronizing binaries from the central database 250 to the local file system of each instance. The bootstrap logic creates a property file (the "instance property" file described below), which describes the processes of the instance.

In one embodiment, the following process occurs during the startup of the instance. The numbers provided correspond to the numbers illustrated in FIG. 3:

(1) JControl is started and initializes signal handling via the central services instance to react to incoming signals. JControl starts JLaunch using a specified set of boostrap properties (stored in a properties file) and JLaunch initializes signal handling via central services. The first argument of JLaunch is the PID of the parent process, JControl. JLaunch starts a thread, which exists until the parent process JControl dies and terminates. JLaunch creates a set of Java virtual machine arguments and initializes the hosting of the virtual machine. In one embodiment, it loads the Java virtual machine into its own process ("VM Hosting"), initializes the virtual machine and starts the bootstrap logic.

(2) The bootstrap logic then synchronizes the binaries from the central database 245 into the local file system of each instance.

(3) The bootstrap program reads the instance description which is stored in the central database 245 and writes the an "instance property" file containing the description and the arguments of the worker/server nodes, which have to be started.

(4) JControl subsequently reads the instance property file created by the bootstrap program and builds a list of nodes which have to be started (5) JControl then starts a separate JLaunch program for each individual node (worker/server nodes and dispatcher) which is to be started. Again, the first argument of each JLaunch program is the PID of the parent process (JControl). JLaunch reads the Java virtual machine arguments from the instance property file, loads the loads the Java virtual machine into its own process (VM Hosting), initializes each virtual machine and starts each node.

(6) Each node reads the kernel properties from the central database and saves them into several hash tables (Global Default, Global Overwritten, Local Default, Local Overwritten). It then starts the kernel framework using the stored properties.

(7) Finally, the service framework and all system and deployed services are started. Once the framework and services are running, the instance is available to process service requests.

Although the service framework and services described herein are a J2EE service framework and J2EE services, it should be noted that various other types of services/frameworks may be employed while still complying with the underlying principles of the invention.

Advanced Techniques for Implementing Native Methods within a Java Environment

Embodiments of the invention will now be described which provide new techniques for implementing native methods within a Java environment. It is assumed at this stage that the reader has an understanding of Java and, more particularly, the Java Native interface ("JNI"). For a detailed description of JNI, see Sheng Liang: *The Java™ Native Interface Programmer's Guide and Specification, the Java Series, Sun Microsystems* (June 1999).

In one embodiment of the invention, the Java launch ("JLaunch") logic described above contains several native methods that are made available to each J2EE instance and to other Java programs. For various reasons, these methods are not implemented as dynamic libraries and, as such, they cannot be loaded through the standard JNI techniques (e.g., using java.lang.System.loadLibrary( ) or java.lang.Runtime.loadLibrary( ) methods). Moreover, the visibility of the Java classes containing these native methods must be controllable, i.e., these classes should not have global visibility.

In one embodiment of the invention, rather than using the System.loadLibrary( ) method, native methods are registered into loaded Java classes using the RegisterNatives( ) function. Rather than relying on the virtual machine to search for native methods within dynamically loaded native libraries, the RegisterNatives( ) function allows native methods to be manually linked by registering a function pointer with a class reference, method name and method descriptor. The format of the RegisterNatives( ) function is as follows:

```
jint RegisterNatives(JNIEnv *env, jclass clazz, const
JNINativeMethod *methods, jint nMethods);
```

This registers native method(s) with the class specified by the clazz argument. The methods parameter specifies an array of JNINativeMethod structures including names, descriptors and function pointers of the native methods. The nMethods parameter specifies the number of native methods in the array. The JNINativeMethod structure is defined as follows:

```
typedef struct {
    char  *name;
    char  *signature;
    void  *FnPtr;
} JNINativeMethod;
```

Unfortunately, initiating the loading of a class from native code using the FindClass( ) function before the class is used in Java causes the class to end up in the classloader for the bootstrap logic with global visibility. Therefore, in one embodiment of the invention, the loading of classes which use native methods from the startup framework is delayed until the J2EE infrastructure needs them in the right context/classloader. Once a Java class using such native methods is loaded, one embodiment of the invention employs a unique mechanism to establish the connection between the loaded class and its native methods. Specifically, a single method with global visibility is used: com.sap.bc.proj.jstartup.JStartupNatives.registerNatives( ). The parameter to the method is the class itself, i.e., a typical code fragment to be used is:

```
/**
 * Link native methods into runtime.
 */
static {
    com.sap.bc.proj.jstartup.JStartupNatives.
    registerNatives(<name>.class);
}
```

As the static initialization is invoked after the class is fully loaded and constructed, the class object passed to registerNatives( ) can be used as a reference to register the native methods into. This avoids class loading that is initiated from native code. Native methods are then registered exactly into the specified class object. They may even be registered several times if the same class is loaded in different class loaders.

Figure 4:
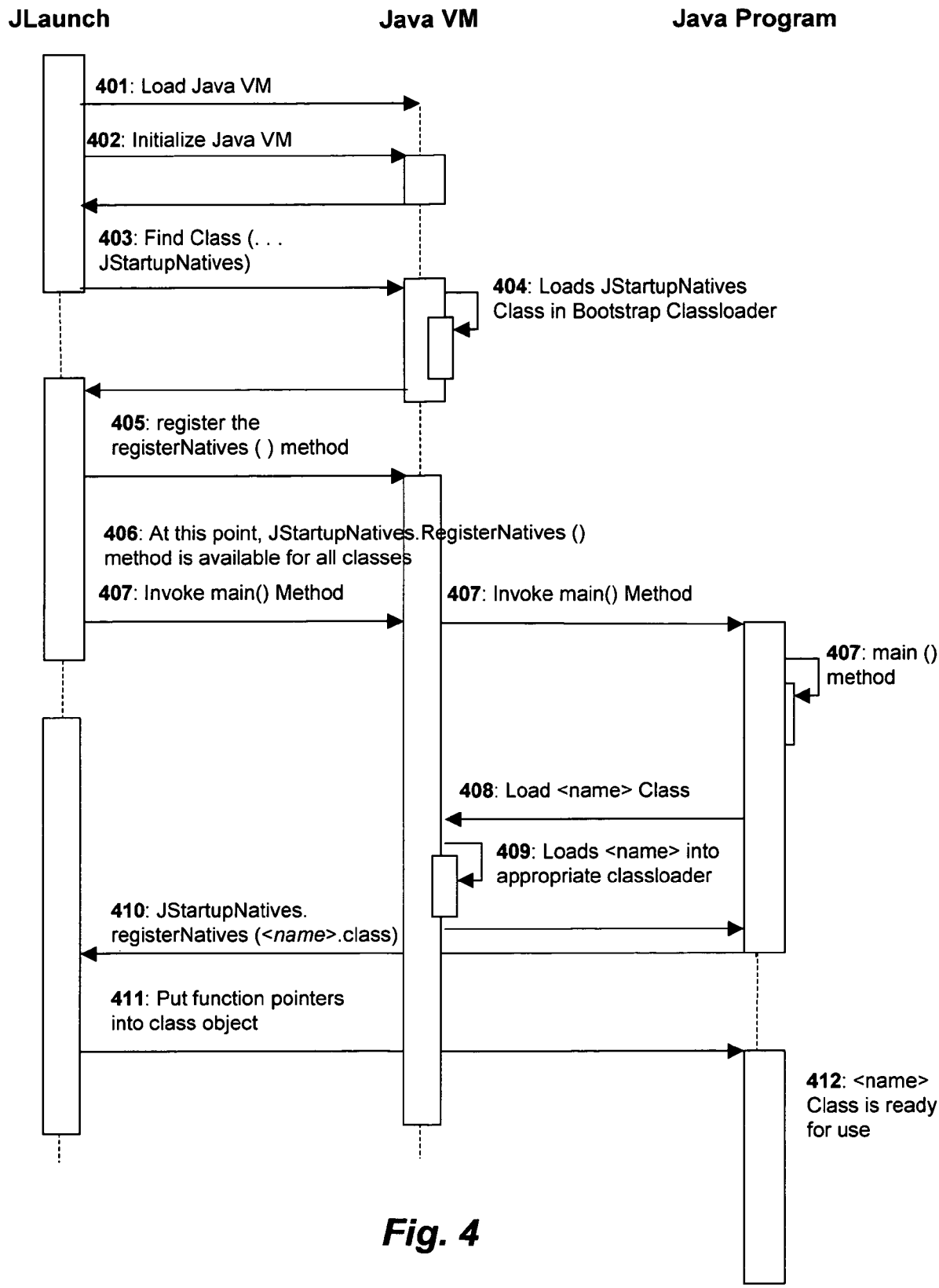
FIG. 4 is a transaction diagram illustrating the principles of one embodiment of the invention.

A transaction diagram which provides a more detailed flow of one embodiment of the invention is illustrated in FIG. 4. At 401, the Java VM is loaded. Specifically, using native OS calls, the dynamic library containing the Java VM is located and loaded into the address space of the hosting process (bootstrap process). The JNI_CreateJavaVM entry point is then derived from the loaded library.

At 402, the Java VM is initialized. In particular, the JNI_CreateJavaVM( ) function is invoked with the arguments for the Java VM. These arguments include native callback functions, system parameters and other settings which control the behavior of the Java VM. This call instantiates the bootstrap logic and the system classloaders and initializes the Java runtime environment. After return from the JNI_CreateJavaVM( ) function, the Java VM is fully operational.

At 403, the JStartupNatives class is located. Using the FindClass( ) method, the native code requests that the JStartupNatives class be loaded.

At 404, the JStartupNatives class is loaded. The Java VM loads the JStartupNatives class into the bootstrap classloader. As the JStartupNatives class contains a method with a native implementation, the class cannot be used yet.

at 405, the registerNatives( ) method is registered. The native code registers the registerNatives method into the jstartupNatives class, thereby providing the implementation for the JStartupNatives. registerNatives( ) Java method.

At 406, the JStartupNatives.registerNatives( ) method can be called by all Java code.

At 407, the main method arguments are prepared and the main( ) method is invoked. The native code collects the arguments for the main( ) method of the Java program, loads the main class as specified in the configuration, and calls the main( ) method. This call starts the operation of the Java program, i.e. the J2EE Engine.

At 408, the <name> Class is loaded. During operation, the Java program accesses an unloaded class, which contains methods that need native implementations provided in the JLaunch process.

At 409, <name> is loaded into an appropriate classloader. The Java VM loads the class into the appropriate classloader, i.e. the classloader that is specified by the invoking environment, and instantiates the class object for <name>.

At 410, the JStartupNatives.registerNatives (<name>.class) is invoked. The program code in the just-loaded class calls JStartupNatives.registerNatives (<name>.class) to register the implementations for its native methods from the Startup Framework (bootstrap logic).

At 411, function pointers are put into class object. Specifically, the native code registers the function pointers of the implementation functions, i.e., it calls the RegisterNatives( ) JNI method with a list of function pointers and their corresponding Java signatures.

At 412, the <name> Class is ready for use by all classes and objects that have access to its classloader.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, although many of the embodiments set forth above relate to a Java or J2EE implementation, the underlying principles of the invention may be implemented in virtually any enterprise networking environment. Moreover, although the native code described above is employed within a startup process for an application server cluster, the native methods may also be used as part of a stand-alone Java program while still complying with the underlying principles of the invention.

Accordingly, the scope and spirit of the invention should be judged in terms of the claims which follow.

What is claimed is:

1. A method for registering a native method in a manner that permits the native method to become globally visible after a class that is designed to invoke the native method is desired for use, the method comprising:
    delaying loading of the class until the class is desired for use, wherein the class is designed to invoke the native method, wherein said delaying occurs even though said native method is not implemented with a dynamic library, said delaying preventing global visibility of said native method before said class is desired for use;
    in response to said class being desired for use, loading the class into an appropriate classloader and instantiating a class object for the class;
    passing an identity of the class object as a parameter to a registration method, the registration method having global visibility; and,
    executing the registration method to insert a function pointer to the native method into the class object, wherein the function pointer includes identification data to identify an implementation of the native method.

2. The method of claim 1 wherein the class is a Java class and the registration method is a RegisterNatives( ) JNI method.

3. The method as in claim 2 wherein the native methods are methods written in C.

4. The method as in claim 2 further comprising registering the RegisterNatives method prior to the loading of the class.

5. The method as in claim 4 further comprising loading a Java virtual machine before the registering of the RegisterNatives method, the Java virtual machine to interpret the class object's program code.

6. The method as in claim 1 wherein the native methods are methods written in C.

7. A machine readable storage medium containing program code that when executed by a digital processing system causes the digital processing system to perform a method for registering a native method in a manner that permits the native method to become globally visible after a class that is designed to invoke the native method is desired for use, the method comprising:
    delaying loading of the class until the class is desired for use, wherein the class is designed to invoke the native method, wherein said delaying occurs even though said native method is not implemented with a dynamic library, said delaying preventing global visibility of said native method before said class is desired for use;
    in response to said class being desired for use, loading the class into an appropriate classloader and instantiating a class object for the class;
    passing an identity of the class object as a parameter to a registration method, the registration method having global visibility; and,
    executing the registration method to insert a function pointer to the native method into the class object, wherein the function pointer includes identification data to identify an implementation of the native method.

8. The method of claim 7 wherein the class is a Java class and the registration method is a RegisterNatives( ) JNI method.

9. The method as in claim 8 wherein the native methods are methods written in C.

10. The method as in claim 8 further comprising registering the RegisterNatives method prior to the loading of the class.

11. The method as in claim 10 further comprising loading a Java virtual machine before the registering of the RegisterNatives method, the Java virtual machine to interpret the class object's program code.

12. The method as in claim 7 wherein the native methods are methods written in C.

13. A computing system comprising a processor and memory, said memory storing program code, said processor to process said program code, said program code to perform a method for registering a native method in a manner that permits the native method to become globally visible after a class that is designed to invoke the native method is desired for use, said method comprising:
    delaying loading of the class until the class is desired for use, wherein the class is designed to invoke the native method, wherein said delaying occurs even though said native method is not implemented with a dynamic library, said delaying preventing global visibility of said native method before said class is desired for use;
    in response to said class being desired for use, loading the class into an appropriate classloader and instantiating a class object for the class;
    passing an identity of the class object as a parameter to a registration method, the registration method having global visibility; and,
    executing the registration method to insert a function pointer to the native method into the class object, wherein the function pointer includes identification data to identify an implementation of the native method.

14. The method of claim 13 wherein the class is a Java class and the registration method is a RegisterNatives( ) JNI method.

15. The method as in claim 14 wherein the native methods are methods written in C.

16. The method as in claim 14 further comprising registering the RegisterNatives method prior to the loading of the class.

17. The method as in claim 16 further comprising loading a Java virtual machine before the registering of the Register-Natives method, the Java virtual machine to interpret the class object's program code.

18. The method as in claim 13 wherein the native methods are methods written in C.

* * * * *